(12) United States Patent
Chen et al.

(10) Patent No.: US 10,990,844 B2
(45) Date of Patent: Apr. 27, 2021

(54) METHOD FOR RETRIEVING LOST OBJECT AND LOST OBJECT RETRIEVAL DEVICE

(71) Applicant: HONGFUJIN PRECISION ELECTRONICS(TIANJIN)CO.,LTD., Tianjin (CN)

(72) Inventors: Yu-Wen Chen, New Taipei (TW); Cheng-Yu Wang, New Taipei (TW); Shih-Yin Tseng, New Taipei (TW)

(73) Assignee: HONGFUJIN PRECISION ELECTRONICS(TIANJIN)CO., LTD., Tianjin (CN)

(*) Notice: Subject to any disclaimer, the term of this patent is extended or adjusted under 35 U.S.C. 154(b) by 64 days.

(21) Appl. No.: 16/517,930

(22) Filed: Jul. 22, 2019

(65) Prior Publication Data

US 2020/0387738 A1  Dec. 10, 2020

(30) Foreign Application Priority Data

Jun. 4, 2019  (CN) .......................... 201910482417.9

(51) Int. Cl.
*G06K 9/46* (2006.01)
*G06K 9/00* (2006.01)
*G06K 9/62* (2006.01)

(52) U.S. Cl.
CPC ....... *G06K 9/4609* (2013.01); *G06K 9/00288* (2013.01); *G06K 9/00671* (2013.01); *G06K 9/4652* (2013.01); *G06K 9/6215* (2013.01); *G06K 2209/25* (2013.01)

(58) Field of Classification Search
CPC ..... G05B 19/00; G06F 3/048; G06F 16/5854; G06Q 10/08; G06Q 40/08; G06Q 10/10; G06Q 50/01; G08B 13/14; G08B 5/22
See application file for complete search history.

(56) References Cited

U.S. PATENT DOCUMENTS

2014/0327518 A1* 11/2014 Loutit .................... G05B 19/00
                                                           340/7.58
2018/0227393 A1*  8/2018 Daub ..................... H04L 67/22

FOREIGN PATENT DOCUMENTS

| CN | 104992398 | 10/2015 |
| CN | 106779599 | 5/2017 |
| CN | 109034094 | 12/2018 |

* cited by examiner

*Primary Examiner* — Manuchehr Rahmjoo
(74) *Attorney, Agent, or Firm* — ScienBiziP, P.C.

(57) ABSTRACT

A method for retrieving an object which becomes lost receives an image of an object from a camera device and analyzes the image to obtain features of the object. The features information comprises category of the object and other details such as serial number. Supplementary information of the object is input on a displayer, the supplemental information comprises time and location of a lost property office or other responsible authority in receiving an object apparently lost. Information according to the features of the object and the supplementary information is broadcast. A device facilitating the retrieval of such object is also disclosed.

16 Claims, 4 Drawing Sheets

METHOD FOR RETRIEVING LOST OBJECT AND LOST OBJECT RETRIEVAL DEVICE

FIELD

The subject matter herein generally relates to property identification and retrieval.

BACKGROUND

People can lose objects, especially in public places, such as MRT stations, department stores, and railway stations. The lost object may be handed to a lost property management department and registered by a staff of the lost property management department. However, a manual registration of the lost object is time-consuming and information of the lost object may be incomplete, the lost object may not be returned to an owner.

Therefore, there is room for improvement within the art.

BRIEF DESCRIPTION OF THE DRAWINGS

Implementations of the present technology will now be described, by way of embodiments with reference to the attached figures.

DETAILED DESCRIPTION

Figure 1:
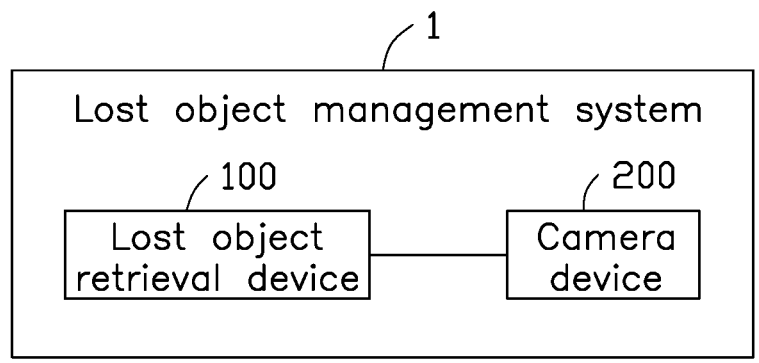
FIG. 1 is a schematic diagram of a lost object management system according to an embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

Referring to FIG. 1, a lost object management system 1 is provided. The lost object management system 1 includes a lost object retrieval device 100 and at least one camera device 200. The lost object retrieval device 100 communicates with the at least one camera device 200.

The camera device 200 can be, but is not limited to, a camera, a video camera, or a mobile phone, a tablet, a mobile terminal, a desktop computer, or other fixed terminal having a photographing or camera function. The camera device 200 is configured to capture images and transmit the images to the lost object retrieval device 100. Images can be of an object, and of face of owner of the object, or a document image.

Figure 2:
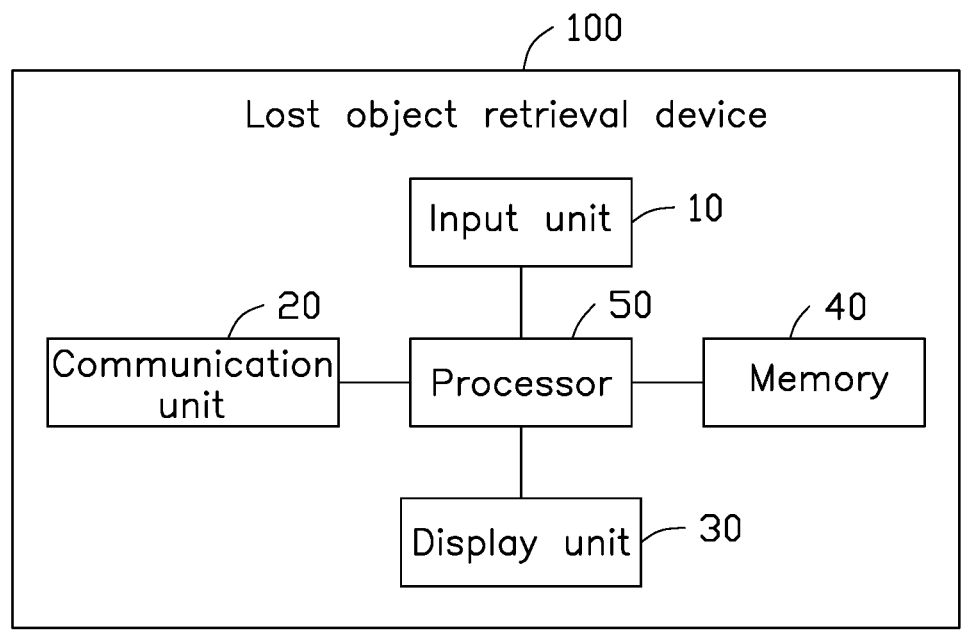
FIG. 2 is a schematic diagram of a lost object retrieval device in the system of FIG. 1.

Referring to FIG. 2, the lost object retrieval device 100 includes an input unit 10, a communication unit 20, a display unit 30, a memory 40, and a processor 50. The input unit 10, the communication unit 20, the display unit 30, and the memory 40 are electrically connected to the processor 50.

The input unit 10 allows users to input information and control instructions, for example, input supplementary information of an object, and the supplementary information includes a pickup time, a pickup location, and a receiving location. Information may also include details of an owner and contact details of the owner. In the embodiment, the input unit 10 may be, but is not limited to, a remote controller, a mouse, a voice input device, a touch screen, or the like.

The communication unit 20 is configured to establish a communication connection with the at least one camera device 200 and the lost object retrieval device 100. The lost object retrieval device 100 receive images transmitted from the imaging device 200.

The communication unit 20 can be a wireless network or a wired network, including, but not limited to, the internet, a local area or WI-FI or BLUETOOTH network, a cellular mobile network, a satellite network, and the like.

The display unit 30 is configured to display details of an object and ownership information of the object. The details include information as to features of the object and the supplementary information. The features information includes one of a brand, a category, a serial number, and an appearance of the object. In the embodiment, the display unit 30 may be, but is not limited to, a display device such as a touch display screen or a liquid crystal display.

The memory 40 is used to store various data in the lost object retrieval device 100, such as images of the lost object, feature information, supplementary information, and the like. In the embodiment, the memory 40 may include, but is not limited to, a read-only memory (ROM), a random access memory (RAM), and a programmable read-only memory (PROM), erasable programmable read-only memory (EPROM), one-time programmable read-only memory (OTPROM), electrically-erasable programmable read-only memory (EEPROM), compact disc read-only memory (CD-ROM) or other optical disc storage, disk storage, tape storage, or any other medium readable by a computer that can be used to carry or store data.

The processor 50 can be a central processing unit (CPU), a microprocessor, a digital processing chip, or any processor chip capable of performing data processing functions.

Figure 3:
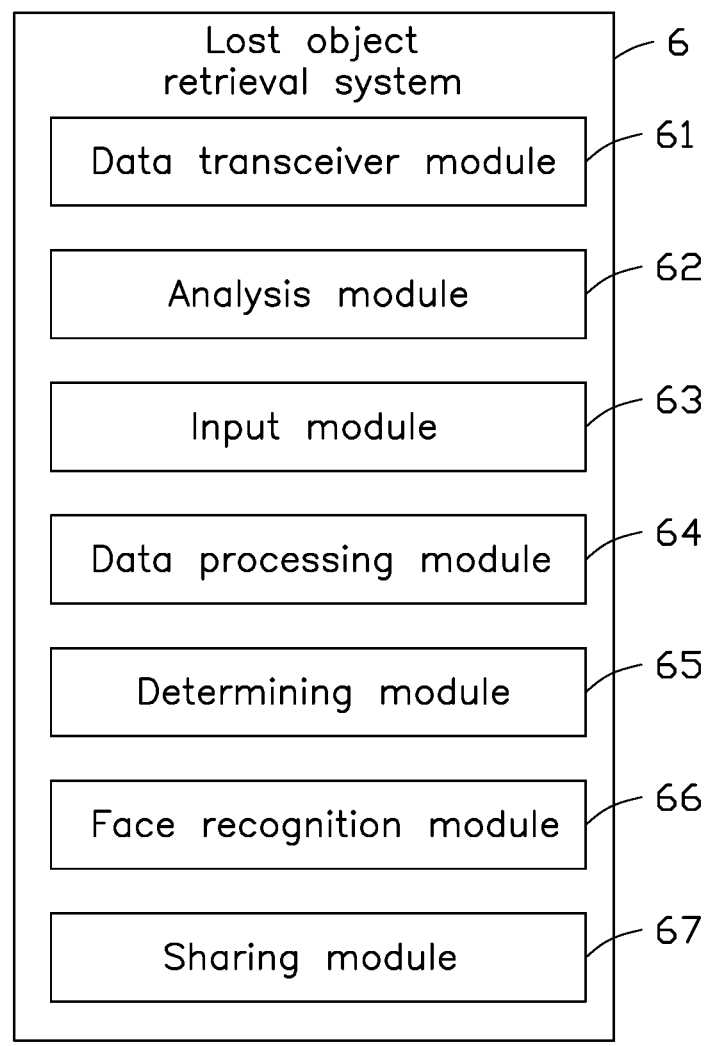
FIG. 3 is a block diagram of the lost object retrieval system according to an embodiment.

Referring to FIG. 3, a lost object retrieval system 6 is operated in the lost object retrieval device 100. FIG. 3 shows functional modules of the lost object retrieval system 6 in an embodiment. In the embodiment, the lost object retrieval system 6 includes computer instructions in the form of one or more programs stored in the memory 40 and executed by the processor 50. The lost object retrieval system 6 includes a data transceiver module 61, an analysis module 62, an input module 63, a data processing module 64, a determining module 65, a face recognition module 66, and a sharing module 67.

The data transceiver module 61 is configured to receive an image of the object transmitted by the camera device 200.

The analysis module 62 is configured to analyze the image of the object by using object recognition technology to obtain features information of the object. For example, the features information can include a brand, a category, a serial number, and an appearance of the lost object.

The input module 63 is provided for input of supplementary information by a staff member of a lost property management department. The supplementary information includes a time and location of receipt of an object apparently lost, and the like.

The data processing module 64 is configured to generate the detailed information according to the features information and the supplementary information. The detailed information include at least one of the features information and the supplementary information. The detailed information may also include the location of the object when received, a notice of the object, contact information of the lost property management department, etc.

The determining module 65 is configured to determine whether the lost property information matches with the stored detailed information.

The face recognition module 66 is configured to use the face recognition technology to obtain confirmation of identity of a recipient or owner of the object based on facial features of the recipient or owner and a police face database.

The sharing module 67 is configured to generate sharing information according to the detailed information, and share the sharing information to a social platform. The social platform includes an identification number of a public platform, for example, a WEIBO or WECHAT public number. It can be understood that the sharing information is derived from but is different to the detailed information. For example, sharing information as to a wallet only includes the fact of containing cash, but does not include amount. For example, sharing information as to a wristwatch includes the fact of a serial number, but not the serial number itself.

When the lost property information matches with the stored detailed information, the data transceiver module 61 sends the owner information to the lost property staff. The owner information includes contact and residence location.

Figure 4:
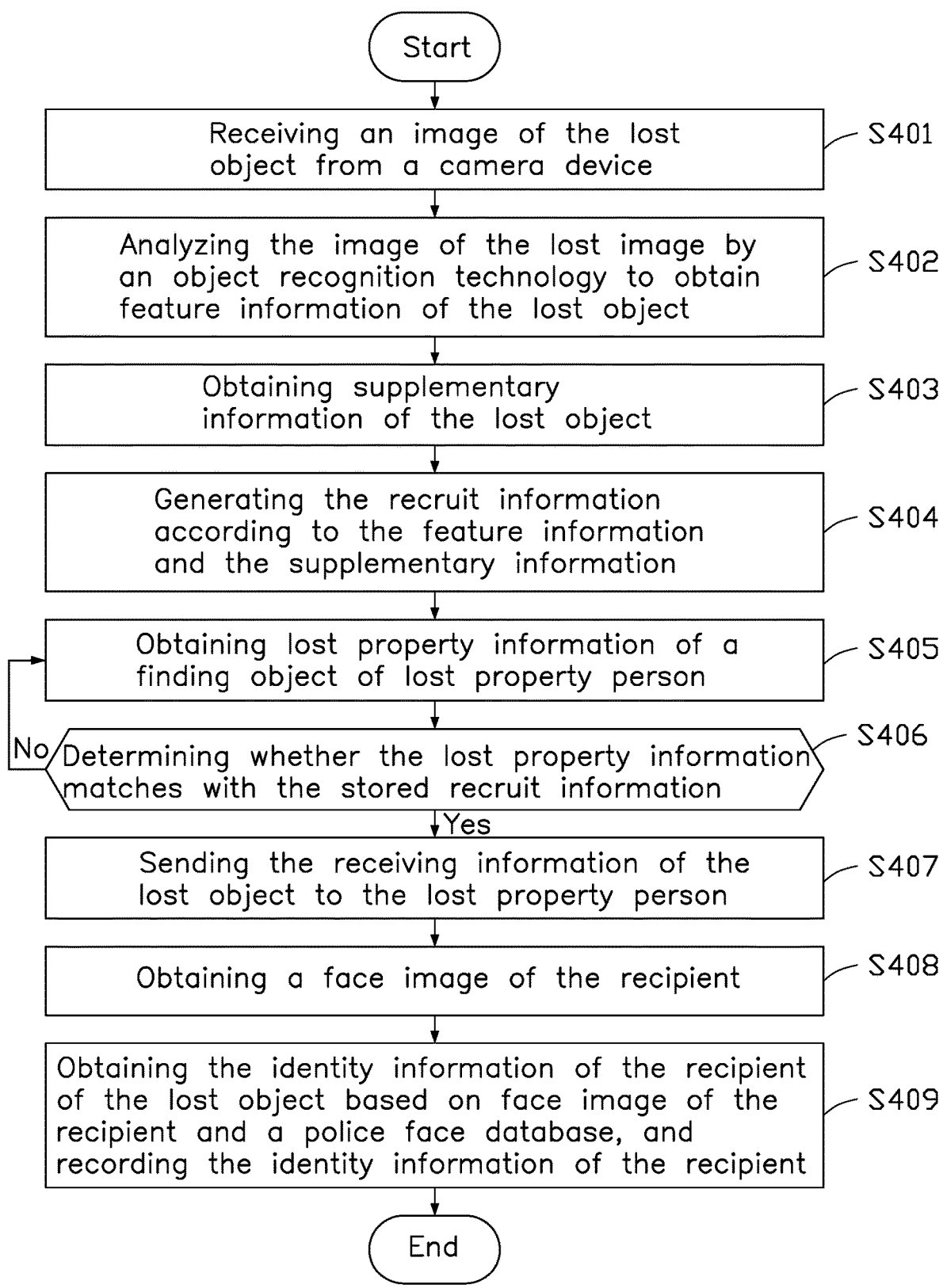
FIG. 4 is a flowchart of a method for retrieving lost object, according to an embodiment.

FIG. 4 illustrates a flowchart of a method for retrieving lost object. The example method is provided by way of example, as there are a variety of ways to carry out the method. Each block shown in FIG. 4 represents one or more processes, methods, or subroutines, carried out in the method. Additionally, the illustrated order of blocks is by example only and the order of the blocks can be changed according to the present disclosure. The method can begin at block 401. Depending on the embodiment, additional steps can be added, others removed, and the ordering of the steps can be changed.

At block 401, receiving an image of the lost object from a camera device.

Specifically, the data transceiver module 61 receives the image of the lost object transmitted by the camera device 200.

At block 402, analyzing the image of the lost image by an object recognition technology to obtain feature information of the lost object. The feature information includes one of a brand, a category, and an appearance of the lost object. The appearance feature may be the color, size, color, etc. of the lost object.

Specifically, the analysis module 62 analyzes the image by using an object recognition technology, and acquires feature information of the lost object. The feature information includes a brand, a category, and an appearance feature of the lost object.

The object recognition technology is a computer vision technology for identifying objects in an image or video, and acquiring features of an object. In the embodiment, the object recognition technology is used to acquire the feature information of the lost object, such as a category (such as a mobile phone, handbags or watches, etc.), brand, color, size.

In another embodiment, the feature information of the lost object is obtained by an object recognition function in an OpenCV (Open Source Computer Vision) library.

At block 403, obtaining supplementary information of the lost object. The supplemental information includes a pickup time and a pickup location of the lost object.

Specifically, the input module 63 is provided to input the supplementary information by a staff member of the lost property management department.

At block 404, generating the recruit information according to the feature information and the supplementary information.

Specifically, the data processing module 64 generates the recruit information according to the feature information and the supplementary information and stores the recruit information.

At block 405, obtaining lost property information of a finding object of the lost property person.

Specifically, the lost property information is input through the input module 63. The lost property implementation includes a category, a lost location, and a lost time of the finding object.

At block 406, determining whether the lost property information matches with the stored recruit information.

Specifically, the determining module 65 determine whether the lost property information queried by the lost property person match with one of the stored recruit information. If the lost property information matches with the stored recruit information, the procedure go to block 407, otherwise the procedure go to block 405. It can be understood that, in other embodiment, if the lost property information does not match with any of the stored recruit information, the procedure returns to block 405, and the display unit 30 displays that an object corresponding to the lost property information does not exist.

At block 407, sending the receiving information of the lost object to the lost property person, and the receiving information includes a receiving location and a receiving notes.

Specifically, the data transceiver module 61 transmits the receiving information of the lost object to the lost property person.

It can be understood that the receiving information can be sent through a text message or a mail.

At block 408, obtaining a face image of the recipient.

Specifically, the data transceiver module 61 obtains the face image of the recipient from the camera device 200.

At block 409, obtaining the identity information of the recipient of the lost object based on face image of the recipient and a police face database, and recording the identity information of the recipient.

Specifically, the face recognition module 66 uses the face recognition technology to obtain the identity information of the recipient of the lost object based on facial features of the recipient and a police face database, and stores the identity information of the recipient in the memory 40.

It can be understood that block 408 and block 409 can be omitted.

It can be understood that block 405 to block 407 can be omitted.

It can be understood that, in other embodiments, after block 407, the method further includes following blocks.

Obtaining the document image of the recipient. The document image includes an image of an identity card, a driver's license or a medical insurance card.

The document image is analyzed through an object recognition technology to obtain the identity information of the recipient.

Specifically, the data transceiver module 61 receives the document image sent by the camera device 200, and the document includes an ID card, a driver's license, or a medical insurance card.

The analysis module 62 analyzes the document image by using the object recognition technology to obtain the identity information of the recipient. The identity information of the recipient includes the name of the recipient and the ID number of the recipient.

It can be understood that, in other embodiments, after block 404, the method further includes following blocks.

Generating sharing information according to the recruit information.

Sharing the sharing information to at least one social platform. The at least one social platform includes an identification number of a public platform, for example, a WEIBO or WECHAT public number.

Specifically, the sharing module 67 generates sharing information according to the recruit information, and share the sharing information to the social platform. The social platform includes a Weibo or a WeChat public number. It can be understood that the sharing information is derived from the recruiting information but different from the recruit information. For example, the sharing information of a wallet only includes coins, but does not includes a number of coins, and the recruit information includes the number of coins.

The lost object retrieval method uses the object recognition technology to convert the feature information of the lost object into text, and records the information of the lost object in the lost object retrieval device 100, which saves an entry time of the lost object, increases the accuracy of entry information, and improves effectiveness, and use face recognition technology to quickly and accurately record the identity information of the recipient.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A method for retrieving lost object comprising:
receiving an image of a lost object from a camera device;
analyzing the image of the lost image to obtain feature information of the lost object, the feature information comprising a category of the lost object;
obtaining supplementary information of the lost object that is input on a displayer by a user, the supplementary information comprising a pickup time of the lost object; and
generating the recruit information according to the feature information and the supplementary information; obtaining lost property information of a request for finding an object, the lost property information comprising a category of the finding object; determining whether the lost property information matches with the recruit information; sending a receiving information of the lost object to a person who made the request for finding an object when the lost property information matches with the recruit information, and the receiving information comprising a receiving location; obtaining a face image of a recipient of the lost object; obtaining an identity information of the recipient according to the face image and a face database; and recording the identity information of the recipient.

2. The method of claim 1, wherein the feature information further comprises brand information of the lost object.

3. The method of claim 1, wherein the feature information further comprises appearance features of the lost object.

4. The method of claim 1, wherein the supplementary information comprises a pickup location of the lost object.

5. The method of claim 4, wherein the receiving information further comprises a receiving notes.

6. The method of claim 5, wherein the lost property information further comprises a location where an object is lost and a lost time when the object is lost.

7. The method of claim 1, further comprising:
generating sharing information according to the recruit information; and
sharing the sharing information to at least one social platform.

8. The method of claim 7, wherein the at least one social platform comprises an identification number of a public platform.

9. A lost object retrieval device comprising:
a displayer;
a memory that stores one or more programs; and
at least one processor, wherein the one or more programs, when executed by the at least one processor, cause the at least one processor to:
receive an image of a lost object from a camera device;
analyze the image of the lost image to obtain feature information of the lost object, the feature information comprising a category of the lost object;
obtain supplementary information of a lost object that is input on the displayer by a user, the supplementary information comprising a pickup time of the lost object; and
generating the recruit information according to the feature information and the supplementary information; obtain lost property information of a request for finding an object, the lost property information comprising a category of the finding object; determine whether the lost property information matches with the recruit information; send a receiving information of the lost object to a person who made the request for finding an object when the lost property information matches with the recruit information, and the receiving information comprising a receiving location; obtain a face image of a recipient of the lost object; obtain an identity information of the recipient according to the face image and a face database; and record the identity information of the recipient.

10. The lost object retrieval device of claim 9, wherein the feature information further comprises brand information of the lost object.

11. The lost object retrieval device of claim 9, wherein the feature information further comprises an appearance features of the lost object.

12. The lost object retrieval device of claim 9, wherein the supplementary information comprises a pickup location of the lost object.

13. The lost object retrieval device of claim 12, wherein the receiving information further comprises a receiving notes.

14. The lost object retrieval device of claim 12, wherein the lost property information further comprises a location where an object is lost and a lost time when the object is lost.

15. The lost object retrieval device of claim 9, wherein the at least one processor is further caused to
    generating sharing information according to the recruit information; and
    share the sharing information to at least one social platform.

16. The lost object retrieval device of claim 15, wherein the at least one social platform comprises an identification number of a public platform.

* * * * *